United States Patent
Lakatos et al.

(10) Patent No.: US 12,444,175 B2
(45) Date of Patent: Oct. 14, 2025

(54) METHOD AND DEVICE FOR TRAINING A STYLE ENCODER OF A NEURAL NETWORK AND METHOD FOR GENERATING A DRIVING STYLE REPRESENTATION REPRESENTING A DRIVING STYLE OF A DRIVER

(71) Applicant: Robert Bosch GmbH, Stuttgart (DE)

(72) Inventors: Peter Lakatos, Nőtincs (HU); Gabor Kovacs, Budapest (HU); Laszlo Szoke, Budapest (HU)

(73) Assignee: ROBERT BOSCH GMBH, Stuttgart (DE)

( * ) Notice: Subject to any disclaimer, the term of this patent is extended or adjusted under 35 U.S.C. 154(b) by 870 days.

(21) Appl. No.: 17/656,941

(22) Filed: Mar. 29, 2022

(65) Prior Publication Data
US 2022/0327812 A1    Oct. 13, 2022

(30) Foreign Application Priority Data
Apr. 12, 2021   (DE) .................... 10 2021 203 587.6

(51) Int. Cl.
*G06V 10/774*  (2022.01)
*G06N 3/0455*  (2023.01)
(Continued)

(52) U.S. Cl.
CPC ....... *G06V 10/7747* (2022.01); *G06N 3/0455* (2023.01); *G06N 3/088* (2013.01); *G06V 10/7715* (2022.01); *G06V 10/82* (2022.01)

(58) Field of Classification Search
CPC ........... G06V 10/7747; G06V 10/7715; G06V 10/82; G06V 40/171; G06N 3/0455;
(Continued)

(56) References Cited

U.S. PATENT DOCUMENTS 11,151,447 B1 * 10/2021 Chen ..................... G01S 7/4091
11,404,087 B1 *  8/2022 Khalilia ............... G06V 40/171
(Continued)

FOREIGN PATENT DOCUMENTS

CA          3162542 A1 *  7/2021 ............. G06N 20/10
CN        106875511 A  *  6/2017
(Continued)

*Primary Examiner* — Steven P Sax
(74) *Attorney, Agent, or Firm* — NORTON ROSE FULBRIGHT US LLP

(57) ABSTRACT

A method for training a style encoder of a neural network. Sensory input variables, which represent a movement of a system and surroundings of the system, are compressed to an abstract driving situation representation in at least one portion of a latent space of the neural network, using a trained situation encoder of the neural network. The sensory input variables are compressed to a driving style representation in at least one portion of the latent space, using the untrained style encoder. The driving style representation and the driving situation representation are decompressed from the latent space to output variables, using a style decoder of the neural network. A structure of the style encoder is changed to train the style encoder until the output variables of the style decoder represent the movement.

10 Claims, 3 Drawing Sheets

(51) Int. Cl.
*G06N 3/088* (2023.01)
*G06V 10/77* (2022.01)
*G06V 10/82* (2022.01)

(58) Field of Classification Search
CPC ........ G06N 3/088; G06N 20/00; G06N 20/10; G06N 20/20; G06N 3/047; G06T 7/143; G06T 11/00; G06F 18/24133; G06F 18/21; G06F 18/2415; G06Q 30/0242; G10L 13/08; G10L 13/02
See application file for complete search history.

(56) References Cited

U.S. PATENT DOCUMENTS

| | | | | |
|---|---|---|---|---|
| 12,271,796 | B2 * | 4/2025 | Louizos | G06N 20/10 |
| 2016/0225053 | A1 * | 8/2016 | Romley | G06T 7/143 |
| 2019/0279075 | A1 * | 9/2019 | Liu | G06N 3/047 |
| 2020/0055515 | A1 * | 2/2020 | Herman | G06V 20/58 |
| 2020/0234086 | A1 * | 7/2020 | Taha | G06F 18/2148 |
| 2020/0310370 | A1 * | 10/2020 | Bogo | G05B 13/0265 |
| 2021/0358164 | A1 * | 11/2021 | Liu | G06N 3/088 |
| 2021/0383585 | A1 * | 12/2021 | Zhao | G06F 18/214 |
| 2022/0227379 | A1 * | 7/2022 | Robinson | B60W 60/0015 |
| 2022/0269937 | A1 * | 8/2022 | Kim | G06N 3/044 |
| 2023/0145535 | A1 * | 5/2023 | Hatamizadeh | G06N 3/02 514/460 |

FOREIGN PATENT DOCUMENTS

| | | | | | |
|---|---|---|---|---|---|
| CN | 110857085 | A | * | 3/2020 | ............ B60W 10/06 |
| CN | 111816156 | A | * | 10/2020 | ............ G10L 13/02 |
| CN | 112132167 | A | * | 12/2020 | ............ G06F 18/21 |
| CN | 112365881 | A | * | 2/2021 | ............ G10L 13/08 |
| CN | 112883806 | A | * | 6/2021 | ......... G06F 18/2415 |
| CN | 109447706 | B | * | 6/2022 | ........ G06Q 30/0242 |
| CN | 114730455 | A | * | 7/2022 | ............. G06T 11/00 |
| JP | 7422785 | B2 | * | 1/2024 | ........... G02B 27/017 |
| JP | 7643459 | B2 | * | 3/2025 | |
| WO | WO-2022128096 | A1 | * | 6/2022 | ....... G06F 18/24133 |

* cited by examiner

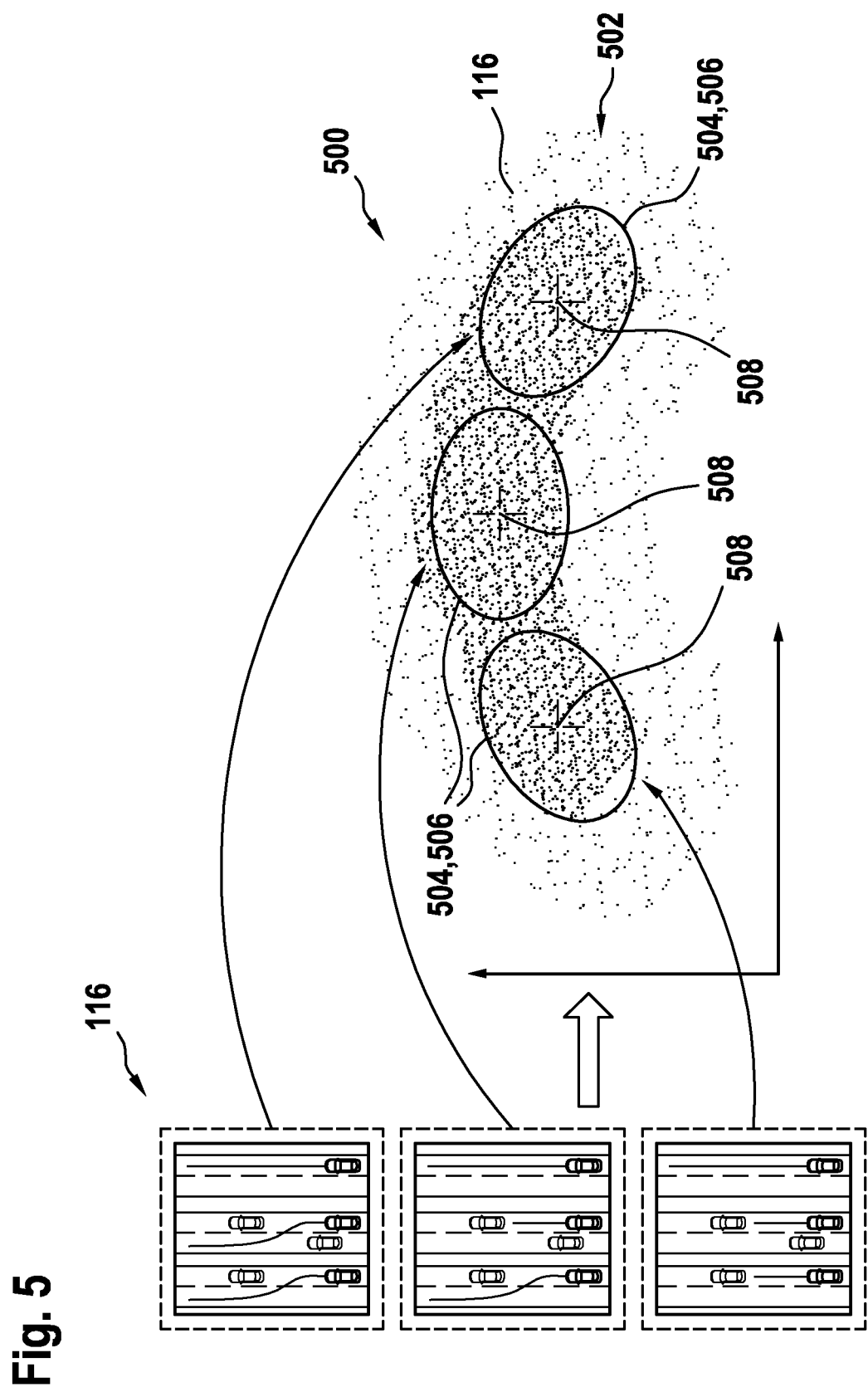

METHOD AND DEVICE FOR TRAINING A STYLE ENCODER OF A NEURAL NETWORK AND METHOD FOR GENERATING A DRIVING STYLE REPRESENTATION REPRESENTING A DRIVING STYLE OF A DRIVER

CROSS REFERENCE

The present application claims the benefit under 35 U.S.C. § 119 of German Patent Application No. DE 10 2021 203 587.6 filed on Apr. 12, 2021, which is expressly incorporated herein by reference in its entirety.

FIELD

The present invention relates to a method for training a style encoder of a neural network as well as a corresponding device and a method for generating a driving style representation representing a driving style of a driver.

BACKGROUND INFORMATION

When a vehicle is driven by a human driver, the driver drives with an individual driving style. If the driver gives up control of the vehicle, i.e., allows the vehicle to drive autonomously or semi-autonomously, the driving style driven by the vehicle differs from the driving style of the driver to a greater or lesser degree. The more the autonomously driven driving style differs from the driving style of the driver, the less comfortable will the driver feel during the autonomous drive.

SUMMARY

A method for training a style encoder of a neural network as well as a corresponding device and a method for generating a driving style representation representing a driving style of a driver, and finally corresponding computer program products and machine-readable memory media are provided according to the present invention. Advantageous refinements on and improvements of the approach presented here result from the disclosure herein.

Specific embodiments of the present invention may advantageously permit a driving style of a driver to be described as an abstract driving style representation without the driving style being described by preset variables. Different driving styles of different drivers may thus be made comparable. The driving style representation may be used to copy the underlying driving style.

In accordance with an example embodiment of the present invention, a method is provided for training a style encoder of a neural network, sensory input variables, which represent a movement of a system and a surroundings of the system, being compressed to an abstract driving situation representation in at least one portion of a latent space of the neural network, using a trained situation encoder of the neural network, and the sensory input data being compressed to a driving style representation in at least one portion of the latent space, using the untrained style encoder, the driving style representation and the driving situation representation being decompressed from the latent space to output variables, using a style decoder of the neural network, for the purpose of training the style encoder, a structure of the style encoder being changed until the output variables of the style decoder representing the movement.

In accordance with an example embodiment of the present invention, a method is furthermore provided for generating a driving style representation representing a driving style of a driver, sensory input data, which represent a movement of a system driven by the driver and surroundings of the system, being compressed as an abstract driving style representation in at least one portion of a latent space of the neural network, using a trained style encoder of a neural network, using a method according to the approach presented here, the driving style representation being extracted from the latent space.

Ideas and features relating to specific embodiments of the present invention may be viewed, among other things, as being based on the considerations and findings described below.

A system may be a vehicle or a robot. The system may be controlled by a driver. The driver may then monitor surroundings of the system and input, via control elements, control commands, which are carried out by actuators of the system. However, the system may also autonomously or at least semi-autonomously perform a predefined driving task. For this purpose, the system may evaluate sensor data, which represent the surroundings and generate control commands for activating the actuators.

An individual driving style of one driver differs from an individual driving style of another driver. For example, the driving style of the one driver may be described as sporty, while the driving style of the other driver may be described as cautious. The driving styles may differ, for example, in how much the system accelerates and decelerates. Likewise, the driving styles may differ in how the driver behaves toward other road users. For example, the one driver may drive more closely behind a preceding vehicle than the other driver. The driving styles of the drivers may also differ in how much risk the driver accepts or how little consideration the driver pays toward the other road users.

A neural network may be, in particular, a convolutional neural network (CNN). The trained neural network reads in input variables and processes information contained in the input variables to output variables. The untrained neural network may be trained using machine learning.

The neural network includes at least one encoder and at least one decoder. A latent space of the neural network is situated between the encoder and the decoder. The latent space forms a bottleneck for the information. The encoder therefore compresses an amount of the read-in information and maps the compressed information in the latent space. To compress the information, superfluous information may be, for example, discarded. The latent space has significantly fewer dimensions than the input variables. The decoder reads in data from the latent space and decompresses these data to the output variables of the neural network.

In accordance with an example embodiment of the present invention, the input variables may be provided as a matrix, tensor or multidimensional vector. The input variables or initial variables may represent an instantaneous or past driving situation. The input variables may be, for example, dynamic driving data. The input variables may include sensor data from sensors of the system. In particular, the input variables may be trajectory data about a trajectory of the system and surroundings data about the surroundings of the system or about a temporal variation of the surroundings.

The trained style encoder is structured by a preceding training process in such a way that it extracts the pieces of information representing the driving style of the driver from the input variables and provides them as the driving style representation in the latent space. The style encoder discards pieces of information which do not characterize the driving style of the driver. The training process may take place using artificially generated or real detected input variables or training data. The artificially generated input variables for the training may be provided by at least one driver model of an ideal driver having a known driving style. A feedback of the output data may take place during the training process to permit a comparison between the output variables and the input variables. After the training process, the structure of the style encoder may be at least partially fixed, i.e., not further changed.

The situation encoder extracts all pieces of information representing the driving situation from the input variables and provides them as a driving situation representation in the latent space. The situation encoder discards pieces of information which do not characterize the driving situation.

The style decoder may recreate output variables from the driving style representation and the driving situation representation, which are to represent the input variables, since the driving style representation and the driving situation representation are to contain all relevant pieces of information in compressed form. The structure of the style encoder continues to be adapted until the output variables represent the input variables to thereby adapt the contents of the driving style representation.

The driving style representation and the driving situation representation may also be decompressed from the latent space to the output variables, using an untrained style decoder of the neural network. To train the style decoder, a structure of the style decoder may be changed until the output variables of the style decoder represent the movement. The style encoder and the style decoder may be trained together. The style encoder learns to provide the driving style representation in such a way that the style decoder may decompress the driving situation and the driving style from the driving style representation and the driving situation representation in a manner equivalent to the input variables. In return, the style decoder learns, in particular, to correctly interpret the driving style representation.

The trained situation encoder is structured by a preceding training process in such a way that it extracts the pieces of information representing the driving situation of the vehicle from the input variables and provides them as the driving situation representation in the latent space. The training process of the situation encoder may take place in the same way as the training process of the style encoder, using the same input variables.

In a preceding step for training the situation encoder, the untrained situation encoder may compress the sensory input variables to the driving situation representation in at least one portion of the latent space. A situation decoder of the neural network may decompress the driving situation representation from the latent space to output variables. A driver classifier may decompress the driving situation representation from the latent space to a piece of driver information in parallel thereto. To train the situation encoder, a structure of the situation encoder may be changed until the driver classifier is unable to decompress driver information from the driving situation representation and the output variables of the situation decoder represent the movement and the surroundings. The situation encoder may be trained using artificially generated training data. The situation encoder may be trained using the same training data as the style encoder. A driver classifier may have pieces of information about the driver model used to generate the training data. As a result, the driver classifier may detect driving style portions of this driver model or pieces of driver information. If no driver information may be decompressed from the driving situation representation, the style encoder has removed all pieces of information about the driver from the information contained in the input variables. If the situation decoder is then still able to restore the input variables, at least in part, the situation encoder has been correctly trained.

The driving situation representation may be decompressed from the latent space to the output variables, using an untrained situation decoder of the neural network. To train the situation decoder, a structure of the situation decoder may be changed until the output variables of the situation decoder represent the movement and the surroundings. The situation encoder and the situation decoder may be trained together. The situation encoder learns to provide the driving situation representation in such a way that the situation decoder may decompress the driving situation from the driving situation representation in a manner equivalent to the driving situation contained in the input variables. In return, the situation decoder learns, in particular, to correctly interpret the driving situation representation.

The extracted driving style representation may be classified using predefined feature ranges. The driving style copied in the driving style representation may be assigned to one of multiple possible driving style classes. For example, attributes may be assigned to the driving style. For example, aggressive, restrained, rapid or slow may be assigned as attributes. The driving style may also be assessed as average.

Driving style representations may be extracted at at least two different points in time. The extracted driving style representations may be transferred to a feature space. The driving style of the driver may be classified using an accumulation of the driving style representations in the feature space. A driving style representation is a snapshot of the driving style. The same driver may react in slightly different ways in similar situations over a longer period of time. The driving style representations may therefore change over the period of time and migrate visually in the feature space. Focal points or accumulations of the driving style representations may form over the period of time. The driving style may be classified with a high degree of certainty, based on the accumulations.

In accordance with an example embodiment of the present invention, control commands for the vehicle may be generated, using the extracted driving style representation and a driving task of the vehicle, if the driver activates an autonomous driving mode for carrying out the driving task. Due to the previously detected driving style representation, the vehicle may drive in autonomous driving mode in a very similar way as previously driven by the driver himself. As a result, the driver may feel very comfortable.

If different driving styles of the driver emerge over multiple driving style representations, the driver may be asked during a change to the autonomous driving mode which of the driving styles the vehicle should drive.

The sensory input variables may be compressed to a driving situation representation in at least one portion of the latent space, using a trained situation encoder of the neural network. The driving style representation and the driving situation representation may be decompressed from the latent space to output variables, using a style decoder of the neural network. The movement described in the output variables may be compared with the movement described in the input variables to check the training of the style encoder. The check may be carried out periodically. A quality of the driving style representation may be maintained by the check. The check may be carried out similarly to the training. If the output variables are not equivalent to the input variables, the neural network may independently begin a new training. The change of the neural network may advantageously not take place during the drive but rather offline or under controlled conditions.

The driving situation representation may be decompressed from the latent space to further output variables, using a situation decoder of the neural network. The movement and surroundings described in the output variables may be compared with the movement and surroundings described in the input variables to check the training of the situation encoder. The check may be carried out periodically. A quality of the driving situation representation may be maintained by the check. The check may be carried out similarly to the training. If the output variables are not equivalent to the input variables, the neural network may independently begin a new training.

The method may be implemented, for example, in software or hardware or in a mixed form of software and hardware, for example in a control unit.

The present invention also provides a device which is designed to carry out, activate or implement the steps of the method presented here in a neural network.

In accordance with an example embodiment of the present invention, the device may be an electrical device including at least one processing unit for processing signals or data, at least one memory unit for storing signals or data, and at least one interface and/or one communication interface for reading in or outputting data embedded in a communication protocol. The processing unit may be, for example, a signal processor, a so-called system ASIC or a microcontroller for processing sensor signals and outputting data signals as a function of the sensor signals. The memory unit may be, for example, a flash memory, an EPROM or a magnetic storage unit. The interface may be designed as a sensor interface for reading in the sensor signals from a sensor and/or as an actuator interface for outputting the data signals and/or control signals to an actuator. The communication interface may be designed to read in or output the data wirelessly and/or in a hard-wired manner. The interfaces may also be software modules, which are present, for example, on a microcontroller alongside other software modules.

In accordance with the present invention, a computer program product or computer program, including program code, is also advantageous, which may be stored on a machine-readable carrier or memory medium, such as a semiconductor memory, a hard disk memory, or an optical memory, and is used for carrying out, implementing and/or activating the steps of the method according to one of the specific embodiments described above, in particular when the program product or program is executed on a computer or a device.

It is pointed out that some of the possible features and advantages of the present invention are described herein with reference to different specific embodiments. Those skilled in the art recognize that the features of the control unit and the method may be suitably combined, adapted or exchanged to obtain additional specific embodiments of the present invention, in view of the disclosure herein.

BRIEF DESCRIPTION OF THE DRAWINGS

Specific embodiments of the present invention are described below with reference to the figures, neither the figures nor the description are to be interpreted as limiting the present invention.

FIG. 5 shows a representation of a transfer of a multiplicity of driving style representations to a feature space.

DETAILED DESCRIPTION OF EXAMPLE EMBODIMENTS

Figure 1:
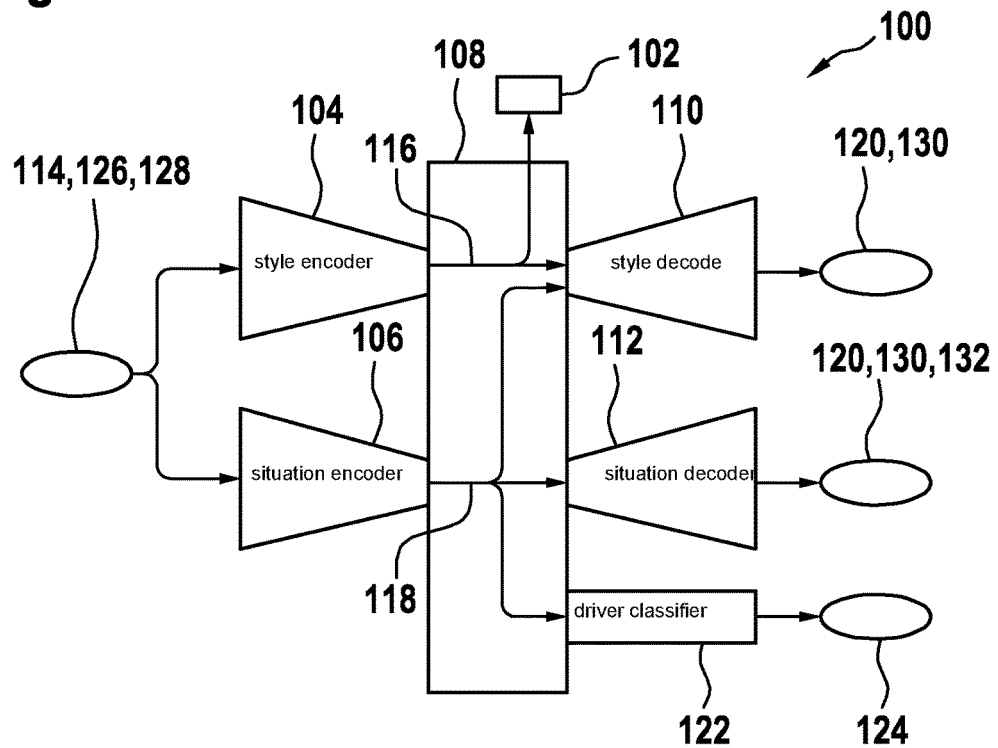
FIG. 1 shows a representation of a neural network, including a device, according to one exemplary embodiment of the present invention.

The figures are only schematic and not true to scale. The same reference numerals designate the same or functionally equivalent features in the figures.

DETAILED DESCRIPTION OF EXAMPLE EMBODIMENTS

FIG. 1 shows a representation of a neural network 100, including a device 102, according to one exemplary embodiment of the present invention. Neural network 100 includes a style encoder 104, a situation encoder 106, a latent space 108, a style decoder 110 and a situation decoder 112. Latent space 108 is situated between encoders 104, 106 and decoders 110, 112. Style encoder 104 is configured to compress input variables 114 to a driving style representation 116 and to provide it in latent space 108. Input variables 114 copy a movement of a vehicle driven by a driver through surroundings of the vehicle. Situation encoder 106 is configured to compress input variables 114 to a driving situation representation 118 and to provide it in latent space 108. Situation decoder 110 is configured to read out driving style representation 116 and driving situation representation 118 from latent space 108 and to decompress them to output variables 120. Situation decoder 112 is configured to read out driving situation representation 118 from latent space 108 and to also decompress it to output variables 120.

Device 102 is connected to neural network 100. In particular, device 102 accesses latent space 108 and is designed to extract driving style representation 116 from latent space 108.

In one exemplary embodiment, a driver classifier 122 also accesses latent space 108. Driver classifier 122 reads out driving situation representation 118 from latent space 108. Driver classifier 122 tries to create a piece of driver information 124 or a driver identity from driving situation representation 118, using stored driver criteria. If situation encoder 106 is structured correctly, driving situation representation 118 does not, however, contain any features, based on which driver classifier 122 may recognize the driver. If driving situation representation 118 is generated correctly, an identification of the driver is therefore not successful. Driver classifier 122 may thus be used to supervise situation encoder 106.

In one exemplary embodiment, input variables 114 are a piece of trajectory information 126 and a piece of surroundings information 128. Trajectory information 126 describes a past trajectory of the vehicle. Trajectory information 126 contains, for example, a sequence of past positions of the vehicle, including time stamps. A speed and direction of the vehicle at the particular point in time may then be derived from this sequence. Likewise, accelerations and decelerations of the vehicle may be determined from the sequence.

Surroundings information 128 describes the surroundings of the vehicle. In particular, surroundings information 128 describes a change in the surroundings over the course of time. The surroundings may be described, for example, as the direction and distance from objects in the surroundings.

Output variables 120 are trajectory data 130 and surroundings data 132. Style decoder 110 outputs trajectory data 130 as output variables 120. If trajectory data 130 are equivalent to trajectory information 126, style decoder 110 works correctly together with style encoder 104 and situation encoder 106.

Situation decoder 112 outputs trajectory data 130 and surroundings data 132 as output variables 120. If trajectory data 130 are equivalent to trajectory information 126, and if surroundings data 132 are equivalent to surroundings information 128, situation decoder 112 works correctly together with situation encoder 106.

Figure 2:
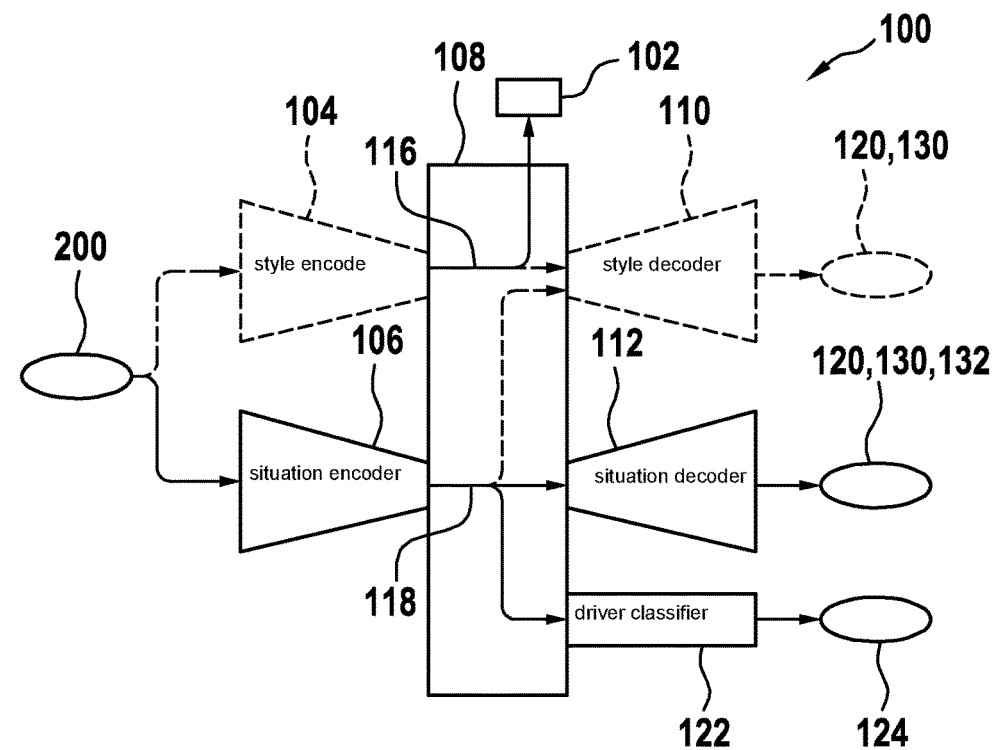
FIG. 2 shows a representation of a training of a situation encoder.

FIG. 2 shows a representation of a training of situation encoder 106 from FIG. 1. Untrained situation encoder 106, situation decoder 112 and driver classifier 122 are operated. The rest of neural network 100 is inactive during the training of situation encoder 106. Training data 200 are provided to situation encoder 106 as input variables 114. Training data 200 copy a driving style of a known driver in different situations. Situation encoder 106 compresses training data 200 to driving situation representation 118 in latent space 108. Situation decoder 112 reads out driving situation representation 118 from latent space 108 and decompresses driving situation representation 118 to output variables 120. In the meantime, driver classifier 122 also reads out driving situation representation 118 from latent space 108 and tries to recognize driver information 124, based on known driver criteria of the known driver.

Output variables 120 are compared with training data 200. A structure of situation encoder 106 continues to be changed, using methods of machine learning, until output variables 120 are equivalent to training data 200. In addition, the structure of situation encoder 106 continues to be changed until driver classifier 122 is no longer able to recognize any driver information 124. When these conditions are met, the structure of situation encoder 106 is fixed for the next step.

In one exemplary embodiment, in addition to situation encoder 106, a structure of situation decoder 112 continues to be changed, using methods of machine learning, until output variables 120 are equivalent to training data 200, and until driver classifier 122 is no long able to recognize any driver information 124.

Figure 3:
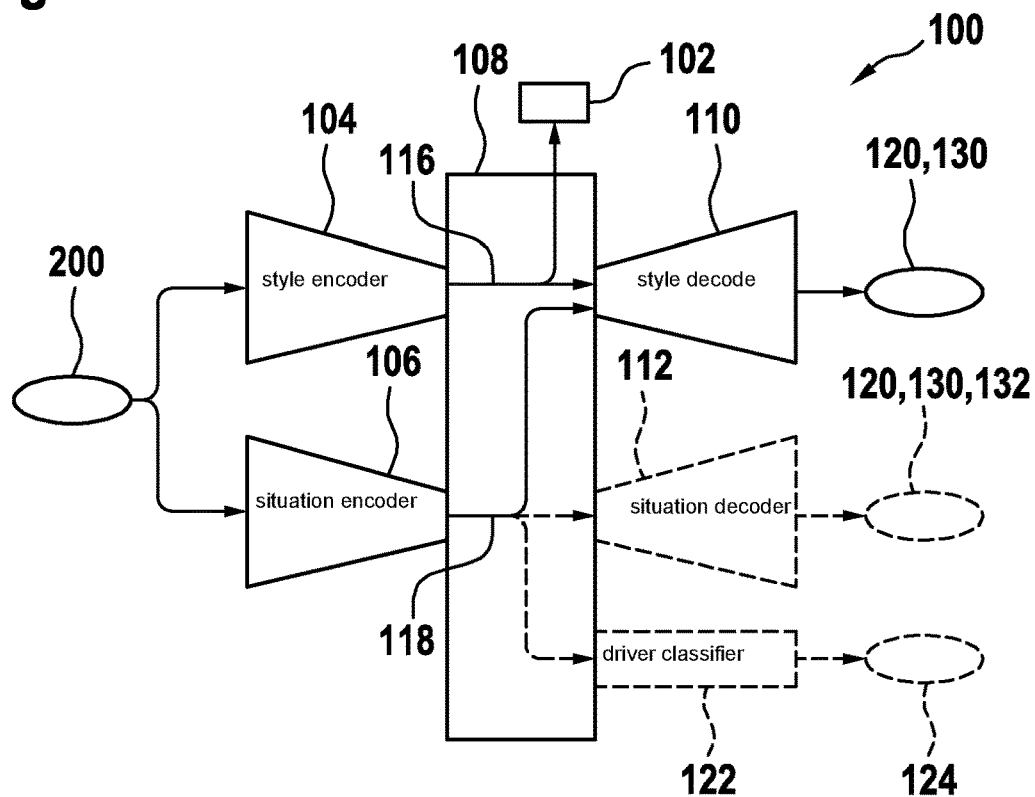
FIG. 3 shows a representation of a training of a style encoder.

FIG. 3 shows a representation of a training of style encoder 104 from FIG. 1. Trained situation encoder 106, untrained style encoder 104 and style decoder 110 are operated. Situation decoder 112 is inactive during the training of style encoder 104. Training data 200 are provided to style encoder 104 and situation encoder 106 as input variables 114. Style encoder 104 compresses training data 200 to driving style representation 116 in latent space 108. Situation encoder 106 compresses training data 200 to driving situation representation 118 in latent space 108. Style decoder 110 reads out driving style representation 116 and driving situation representation 118 from latent space 108 and decompresses them to output variables 120. Output variables 120 are compared with training data 200. A structure of style encoder 104 continues to be changed, using methods of machine learning, until output variables 120 are equivalent to training data 200. If this condition is met, the structure of style encoder 104 is fixed.

In one exemplary embodiment, in addition to style encoder 104, a structure of style decoder 110 also continues to be changed, using methods of machine learning, until output variables 120 are equivalent to training data 200.

Figure 4:
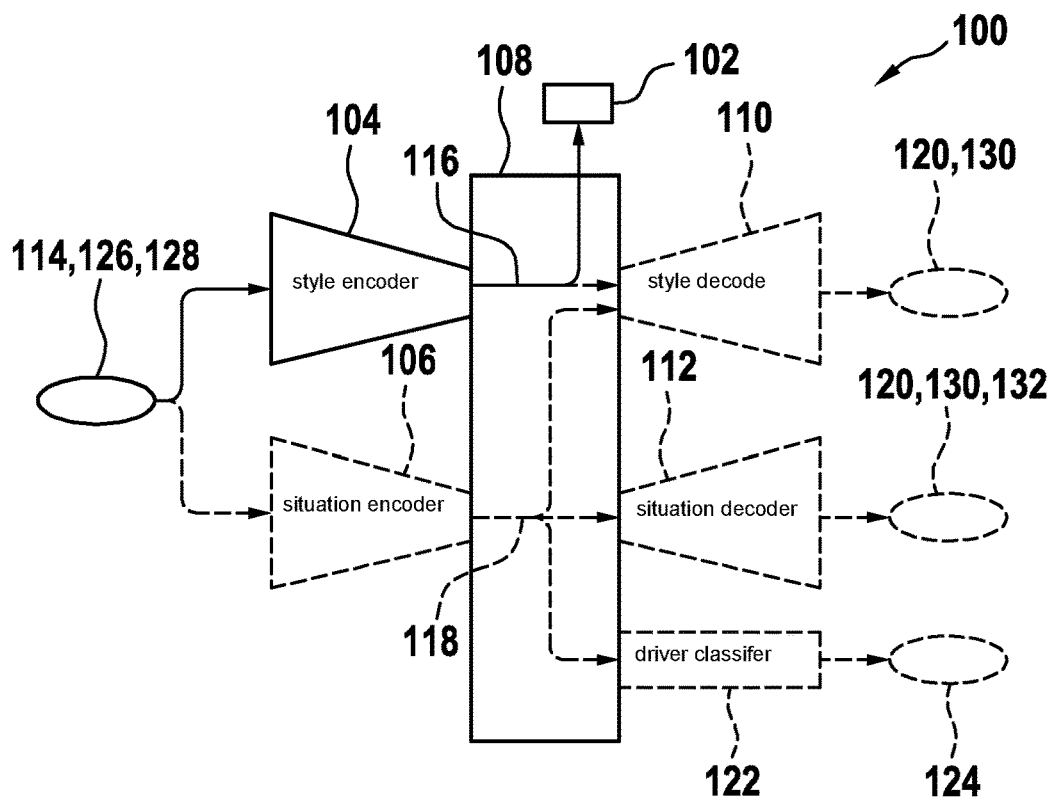
FIG. 4 shows a representation of an extraction of a driving style representation.

FIG. 4 shows a representation of an extraction of a driving style representation 116. Trained style encoder 104 is operated. The rest of neural network 100 is inactive during the extraction of driving style representation 116. Alternatively, only trained style encoder 104 may be transferred to the vehicle. Trained style encoder 104 is supplied with real input variables 114 and compresses them to driving style representation 116. Style encoder 104 provides driving style representation 116 in latent space 108. Device 102 extracts driving style representation 116 from latent space 108.

In one exemplary embodiment, style encoder 104 is continuously supplied with input variables 114 while the driver is driving the vehicle. Driving style representations 116 are collected and further processed.

In one exemplary embodiment, situation encoder 106 is also operated and compresses real input variables 114 to driving situation representation 118 in latent space 108. Style decoder 110 is also operated and reads out driving style representation 116 and driving situation representation 118 from latent space 108 and decompresses them to output variables 120. Output variables 120 are compared with input variables 114. If output variables 120 are equivalent to input variables 114, the structures of style encoder 104 and situation encoder 106 have been correctly trained. If output variables 120 are not equivalent to input variables 114, either both structures of style encoder 104 and situation encoder 106 are defective, or at least the structure of style encoder 104 or that of situation encoder 106 is defective.

To check the structure of situation encoder 106, situation decoder 112 and driver classifier 122 may then also be operated. Output variables 120 of situation decoder 112 are compared with input variables 114. When driver classifier 122 is unable to recognize any driver information 124 and output variables 120 are equivalent to input variables 114, the structure of situation encoder 106 has been correctly trained. Style encoder 104 may then be trained as in FIG. 3. When driver classifier 122 is able to recognize a piece of driver information 124, or when output variables 120 are not equivalent to input variables 114, the structure of situation encoder 106 is defective and may be trained as in FIG. 2.

FIG. 5 shows a representation of a transfer of a multiplicity of driving style representations 116 to a feature space 500. Feature space 500 is illustrated two-dimensionally here to simplify the representation. A different criterion of driving style representation 116 is plotted on each axis of the feature space. Feature space 500 may also be multidimensional. In particular, feature space 500 may have the same number of dimensions as driving style representation 116. Each driving style representation 116 is plotted as a coordinate point in feature space 500.

The many driving style representations 116 differ from each other to a greater or lesser degree. This results in a point cloud 502 in feature space 500. If many similar driving style representations 116 are plotted, the result is an accumulation 504 of driving style representations 116 in feature space 500. A generalized driving style 506 may be found by using accumulation 504. For example, a focal point 508 of accumulation 504 may be used to describe driving style 506. A driving style representation 116 having the values of focal point 508 may be used to control the vehicle when the driver switches to an autonomous or semi-autonomous driving mode. Outliers may be well compensated for by using focal point 508.

In one exemplary embodiment, driving style representations 116 of different drivers having different driving styles 506 are transferred to feature space 500. This results in multiple accumulations 504, which may partially overlap. Based on the different focal points 508, different driving styles 506 may be defined. For example, at least one of the drivers drives a high-risk driving style 506, while at least one other driver drives a very restrained driving style 506. At least one third driver drives an average driving style 506, which is between high-risk driving style 506 and restrained driving style 506.

In one exemplary embodiment, found driving styles 506 are used as preselectable driving styles for generating control commands for an autonomous or semi-autonomous vehicle. A user or driver of the autonomous or semi-autonomous vehicle may make a selection as to which driving style the vehicle is to drive.

In other words, an abstract driving style representation is presented for automated driving.

In the approach presented here, pieces of information about the driving style of vehicle drivers are extracted from sensory data, using methods of machine learning. Driving style representations and classifications are conventionally based on manually parameterized features, for example acceleration rates or a steering angle rotational speed. The approach presented here, however, provides an abstract representation and does not base the solution on manually parameterized features.

The abstract representation of a driving style of a human driver is achieved by an extraction of the pieces of style information of the car driver from his/her trajectory. With the aid of this representation, an appropriate prediction of the road user style may be made, which results in a better automated understanding of situations, in which driver assistance products (DA) or automated driving (AD) are employed. The presented method uses the extraction of a representation of general trajectories from the latent space in an abstract manner.

The method and structure of the provided algorithm indicates improvements and possibilities in the abstract driving style extraction. The extraction of the pieces of style information is achieved, in that the training process is supplied to the employed encoder and decoder parts of the provided neural network. Moreover, an information bottleneck is used, which improves the compression of the pieces of information. The latent space is formulated by the decoder as well as by the introduced contradictory training of the classifier. The neural network parts are thus maintained with restrictions, which help to improve the latent space representation between the encoder and the decoder. A neural network is created thereby, which generates an abstract driving style representation of a driver from his/her trajectory.

The neural network model is supplied with sensory inputs, such as trajectory and surroundings. The trajectory may be represented as a position sequence or a sequence of shifts between time frames. The surroundings may be represented in different ways. For example, the surroundings may be described by a 360-line vector, which describes the distance of the nearest object for each degree of direction around the vehicle. Likewise, the surroundings may be represented, in particular, as a high-resolution map. The surroundings may also be represented as an image, which is rendered from the surroundings. The surroundings may also be shown as a graph-based representation. The exact form of the surroundings representation may vary.

The situation encoder illustrated in FIG. 1 encodes and extracts pieces of information about the situation-related aspects of the trajectory and the surroundings, while the style encoder extracts from the same input whatever was left out of the situation representation. What was left out corresponds to the driving style. The style decoder of the network tries to restore the original input from the latent space of the two encoders. The training is also guided by the driver ID classification module, which forces the situation encoder to encode only those pieces of information from which the driver may not be recognized. The situation representation thus does not contain a driving style. The model intentionally contains an information bottleneck, which helps extract only the minimum amount of information from the input which is necessary for the style representation. Forcing a better abstraction of the style encoder also makes the situation encoder better.

The training is divided into different steps.

FIG. 1 shows the complete architecture of the model. Two encoders exist, one for style and one for situation encoding. The decoders are also divided in this way. The classification tries to guess the driver from the latent space of the situation encoder, which forces it to not encode any style data.

In the first training step, the situation encoder is trained as in FIG. 2.

Due to the first training step, the situation encoder learns how to extract the situation from the input trajectories. In the second step, the style encoder then learns to contain the style representation in its output, as in FIG. 3.

Once the training has been completed, the style encoder may be used as in FIG. 4 to extract the style of the input, i.e., to provide pieces of information to the appropriate driver in each case.

The abstract driving style representation is used in one exemplary embodiment for the abstract representation for the style of the ego vehicle.

Driver assistance systems (DA) and automated driving systems (AD) have an enormous quantity of parameters. These parameters are calibrated during the development process of the system. After a number of tests, non-safety-critical parameters are conventionally set by an expert, based on the tests, using a number of manually set values. This applies, in particular, to the parameters which influence the driving style of AD systems. The approach presented here makes it possible to systematically find the right parameters of systems of this type. These parameters offer realistic driving styles. An exhaustive set of driving styles may be provided.

Higher degrees of automation in AD systems pose new challenges for product acceptance. Much higher comfort requirements on the part of the driver result in these more complex systems. A functionally correct and safe vehicle may always still give rise to serious complaints on the part of the end user if it does not behave as desired by the driver. There is thus a high risk of being rejected by the driver if the style is incorrectly oriented.

Different users may wish to have different driving styles of the AD system. Due to the approach presented here, the correct parameters for realistic driving styles of systems of this type may be systematically found. This ensures product acceptance and satisfaction on the part of the end consumer.

In the approach presented here, the correct parameters for realistic driving styles of systems of this type are systematically found. AI, in particular machine learning, is used for this purpose, based on the abstract style representation. The abstract style representation uses machine learning to create a representation of the driving style of human drivers in a way which is independent of the AD system to be parameterized. This makes it possible to fully discuss the driving styles of human drivers. Based on this investigation, realistic styles may be found, which are acceptable to human drivers. The search for these styles is automated, but the output may also be optimized, resulting in full control over the output.

The abstract style representation may be used to find multiple desired driving styles. For this purpose, a multiplicity of abstract style representations of human drivers are created. An abstract style descriptor is set for each driver or each driving example. The styles in the space of the abstract style representation are grouped into clusters. The space of possible driving styles is completely described in this way. Cluster centers of the clusters may be sought. These are the representative elements of the clusters. They are used as candidates for the possible driving styles of the AD system. For each selected cluster representative, a parameter set is defined for the planner of the AD systems who implements this style. The AD system may emulate the driving style of this group of drivers in this way.

By reinforcement learning or using a Gaussian process, optimal parameter values may be sought for a non-derivable function. (Here, this is the similarity of the abstract driving style description of the planner to the style of the cluster representative.) However, the planner deals with the safety of the system as the main task. A driving style, however, [is] emulated only within the safety limits of the system. The driver may select the desired driving style via a user interface (e.g., during the drive).

Finally, it should be noted that terms such as "having," "including," etc. do not exclude other elements or steps, and terms such as "a" or "one" do not exclude a plurality. Reference numerals herein are not to be considered as limitations.

What is claimed is:

1. A computer-implemented method performed by a processor for training a style encoder of a neural network, the processor receiving sensory data produced by a sensor, the processor performing the following steps:
   compressing sensory input variables, which represent a movement of a system and surroundings of the system, to an abstract driving situation representation in at least one portion of a latent space of the neural network, using a trained situation encoder of the neural network;
   compressing the sensory input variables into a driving style representation in at least one portion of the latent space, using an untrained style encoder;
   decompressing the driving style representation and the driving situation representation from the latent space to output variables, using a style decoder of the neural network; and
   changing a structure of the style encoder to train the style encoder until the output variables of the style decoder represent the movement;
   wherein, in a preceding step for training the situation encoder, the sensory input variables are compressed to the driving situation representation in at least one portion of the latent space, using the untrained situation encoder, and the driving situation representation is decompressed from the latent space to the output variables using a situation decoder of the neural network, and a driver classifier decompresses the driving situation representation from the latent space to a piece of driver information including a driver identity based on driver criteria, a structure of the situation encoder being changed to train the situation encoder until the driver classifier is unable to decompress any driver information from the driving situation representation, and wherein the output variables of the situation decoder represent the movement and the surroundings; and
   wherein the driving situation representation is decompressed from the latent space to the output variables using an untrained situation decoder of the neural network, a structure of the situation decoder being changed to train the situation decoder until the output variables of the situation decoder represent the movement and the surroundings.

2. The method as recited in claim 1, wherein the driving style representation and the driving situation representation are decompressed from the latent space to the output variables, using an untrained style decoder of the neural network, a structure of the style decoder being changed to train the style decoder until the output variables of the style decoder represent the movement.

3. A computer-implemented method performed by a processor for generating a driving style representation representing a driving style of a driver, the processor receiving sensory data produced by a sensor, the processor performing the following steps:
   compressing sensory input variables, which represent a movement of a system driven by the driver and surroundings of the system as an abstract driving style representation in at least one portion of a latent space of a neural network, using a trained style encoder of the neural network, the style encoder being trained by:
   compressing first sensory input variables, which represent a first movement of a system and first surroundings of the system, to a first abstract driving situation representation in at least one portion of the latent space of the neural network, using a trained situation encoder of the neural network,
   compressing the first sensory input variables into a first driving style representation in at least one portion of the latent space, using an untrained style encoder,
   decompressing the first driving style representation and the first driving situation representation from the latent space to first output variables, using the style decoder of the neural network, and
   changing a structure of the style encoder to train the style encoder until the first output variables of the style decoder represent the first movement;
   wherein, in a preceding step for training the situation encoder, the sensory input variables are compressed to the driving situation representation in at least one portion of the latent space, using the untrained situation encoder, and the driving situation representation is decompressed from the latent space to the output variables using a situation decoder of the neural network, and a driver classifier decompresses the driving situation representation from the latent space to a piece of driver information including a driver identity based on drive criteria, a structure of the situation encoder being changed to train the situation encoder until the driver classifier is unable to decompress any driver information from the driving situation representation, and wherein the output variables of the situation decoder represent the movement and the surroundings; and
   wherein the driving situation representation is decompressed from the latent space to the output variables using an untrained situation decoder of the neural network, a structure of the situation decoder being changed to train the situation decoder until the output variables of the situation decoder represent the movement and the surroundings; and extracting the driving style representation from the latent space.

4. The method as recited in claim 3, wherein the extracted driving style representation is classified using predefined feature ranges.

5. The method as recited in claim 3, wherein driving style representations are extracted at at least two different points in time, and the extracted driving style representations are transferred to a feature space, a driving style of the driver being classified using an accumulation of the driving style representations in the feature space.

6. The method as recited in claim 3, wherein control commands for the system are generated, using the extracted driving style representation and a driving task of the system, when the driver activates an autonomous driving mode for carrying out the driving task.

7. The method as recited in claim 3, wherein the sensory input variables are compressed to the driving situation representation in at least one portion of the latent space, using the trained situation encoder of the neural network, the driving style representation and the driving situation representation being decompressed from the latent space to output variables, using the style decoder of the neural network, a movement described in the output variables being compared with the movement described in the input variables to check the training of the style encoder.

8. The method as recited in claim 7, wherein the driving situation representation is decompressed from the latent space to further output variables, using the situation decoder of the neural network, a movement and surroundings described in the output variables being compared with the movement and surroundings described in the input variables to check the training of the situation encoder.

9. A device configured to train a style encoder of a neural network, the device including a processor which receives sensory data produced by a sensor, the processor being configured to:
    compress sensory input variables, which represent a movement of a system and surroundings of the system, to an abstract driving situation representation in at least one portion of a latent space of the neural network, using a trained situation encoder of the neural network;
    compress the sensory input variables into a driving style representation in at least one portion of the latent space, using an untrained style encoder;
    decompress the driving style representation and the driving situation representation from the latent space to output variables, using a style decoder of the neural network; and
    change a structure of the style encoder to train the style encoder until the output variables of the style decoder represent the movement;
    wherein, in a preceding step for training the situation encoder, the sensory input variables are compressed to the driving situation representation in at least one portion of the latent space, using the untrained situation encoder, and the driving situation representation is decompressed from the latent space to the output variables using a situation decoder of the neural network, and a driver classifier decompresses the driving situation representation from the latent space to a piece of driver information including a driver identity based on driver criteria, a structure of the situation encoder being changed to train the situation encoder until the driver classifier is unable to decompress any driver information from the driving situation representation, and wherein the output variables of the situation decoder represent the movement and the surroundings; and wherein the driving situation representation is decompressed from the latent space to the output variables using an untrained situation decoder of the neural network, a structure of the situation decoder being changed to train the situation decoder until the output variables of the situation decoder represent the movement and the surroundings.

10. A non-transitory machine-readable storage medium on which is stored a computer program for training a style encoder of a neural network, the computer program, when executed by a processor which receives sensory data produced by a sensor, causing the processor to perform the following steps:
    compressing sensory input variables, which represent a movement of a system and surroundings of the system, to an abstract driving situation representation in at least one portion of a latent space of the neural network, using a trained situation encoder of the neural network;
    compressing the sensory input variables into a driving style representation in at least one portion of the latent space, using an untrained style encoder;
    decompressing the driving style representation and the driving situation representation from the latent space to output variables, using a style decoder of the neural network; and
    changing a structure of the style encoder to train the style encoder until the output variables of the style decoder represent the movement;
    wherein, in a preceding step for training the situation encoder, the sensory input variables are compressed to the driving situation representation in at least one portion of the latent space, using the untrained situation encoder, and the driving situation representation is decompressed from the latent space to the output variables using a situation decoder of the neural network, and a driver classifier decompresses the driving situation representation from the latent space to a piece of driver information including a driver identity based on driver criteria, a structure of the situation encoder being changed to train the situation encoder until the driver classifier is unable to decompress any driver information from the driving situation representation, and wherein the output variables of the situation decoder represent the movement and the surroundings; and
    wherein the driving situation representation is decompressed from the latent space to the output variables using an untrained situation decoder of the neural network, a structure of the situation decoder being changed to train the situation decoder until the output variables of the situation decoder represent the movement and the surroundings.

* * * * *